Figure 8:
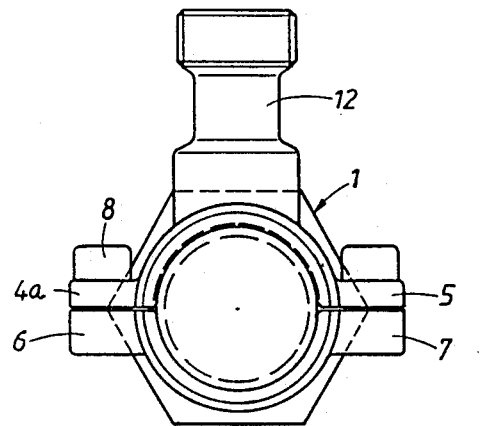

United States Patent [19]

Heed et al.

[11] Patent Number: 4,949,744
[45] Date of Patent: Aug. 21, 1990

[54] METHOD AND DEVICE FOR MOUNTING A BODY IN A CONDUIT CONTAINING FLUID

[76] Inventors: Kai Heed; Anne Wikengård-Heed, both of Brobyvägen 16, S-614 00 Söderköping, Sweden

[21] Appl. No.: 360,896
[22] PCT Filed: Dec. 3, 1987
[86] PCT No.: PCT/SE87/00576
§ 371 Date: May 24, 1989
§ 102(e) Date: May 24, 1989
[87] PCT Pub. No.: WO88/04386
PCT Pub. Date: Jun. 16, 1988

[30] Foreign Application Priority Data

Dec. 4, 1986 [SE] Sweden ................... 8605208

[51] Int. Cl.⁵ .................. F16K 43/00; F16L 55/12
[52] U.S. Cl. ..................... 137/15; 73/863.85; 73/866.5; 137/317; 137/518; 138/93; 138/97; 285/197
[58] Field of Search .............. 137/15, 315, 317, 318; 138/89, 93, 97; 285/197, 198, 199; 73/863.85, 866.5

[56] References Cited

U.S. PATENT DOCUMENTS

| 2,264,822 | 12/1941 | Ahern | 138/93 |
| 2,763,282 | 9/1956 | Reedy et al. | 137/318 |
| 2,899,983 | 8/1959 | Farris | 137/318 |
| 3,240,227 | 3/1966 | Burkholder | 137/318 |
| 3,930,413 | 1/1976 | Laird et al. | 137/317 |
| 4,111,588 | 9/1978 | Herron | 137/318 |
| 4,122,869 | 10/1978 | Roberson, Sr. | 138/93 |
| 4,127,141 | 11/1978 | Ledonne et al. | 137/315 |
| 4,155,373 | 5/1979 | DiGovanni | 137/318 |
| 4,331,170 | 5/1982 | Wendell | 137/318 |
| 4,351,349 | 9/1982 | Minotti | 137/318 |

Primary Examiner—George L. Walton

[57] ABSTRACT

Method and device for mounting a body in a conduit containing fluid. An installation unit is mounted on the fluid at that place, where the mounting of said body is desired, whereby sealing is established against the environment around an area, where a hole is going to be made in the surface of the conduit. The hole is made in the conduit in said area maintaining sealing against the environment. A body is inserted through the hole, so that the body will be placed in the conduit.

9 Claims, 5 Drawing Sheets

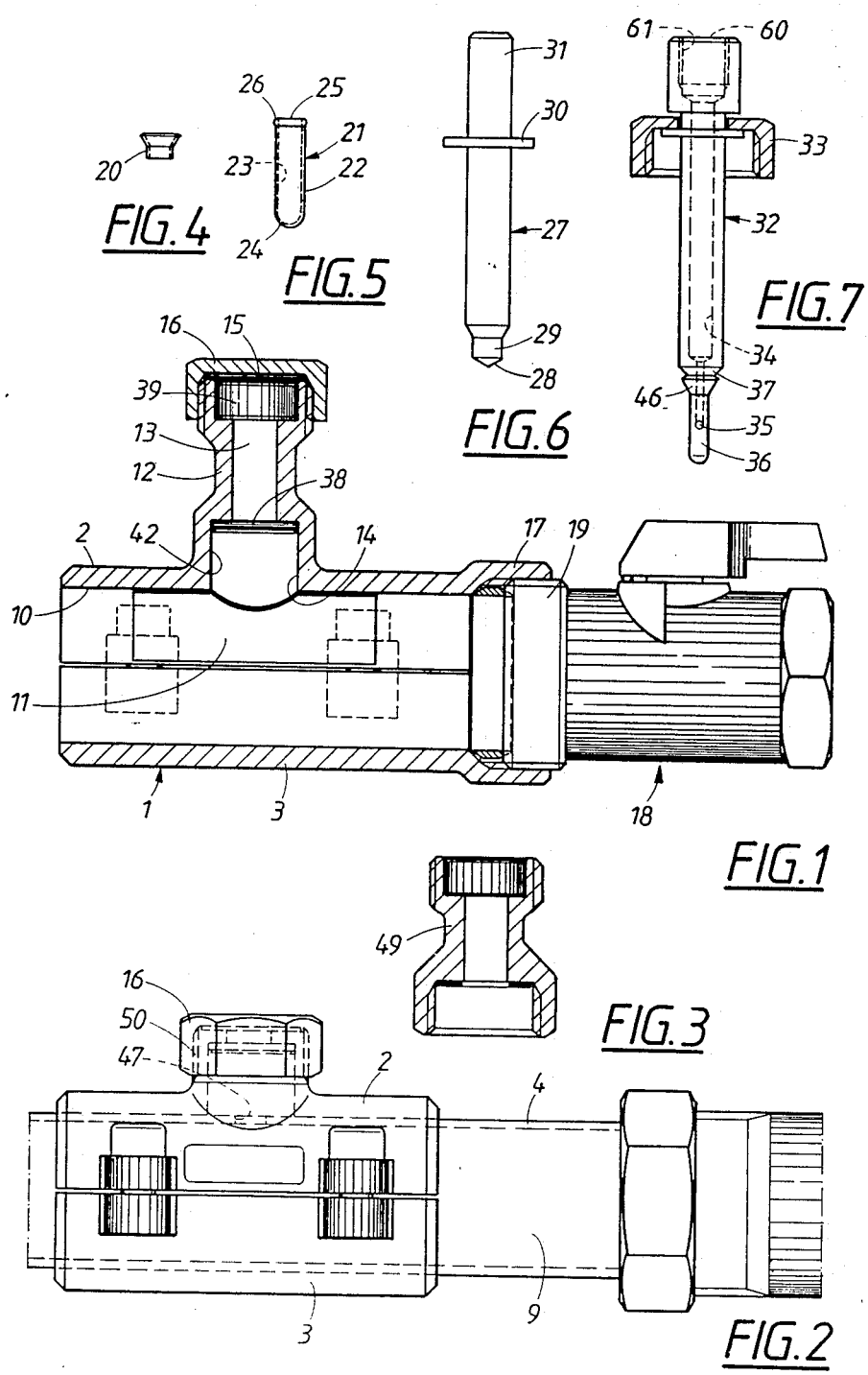

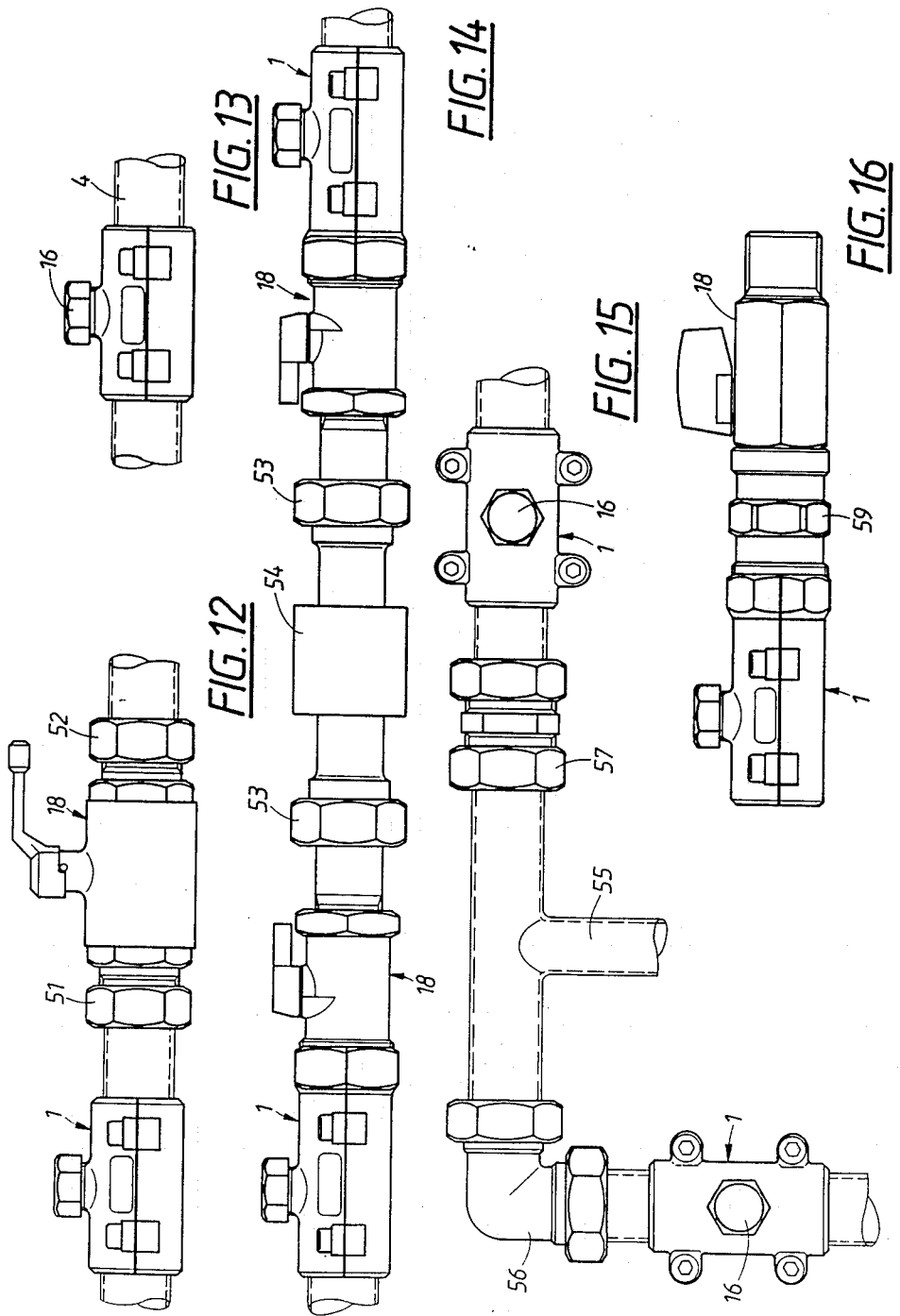

METHOD AND DEVICE FOR MOUNTING A BODY IN A CONDUIT CONTAINING FLUID

The present invention relates to a method for mounting a body in a conduit containing fluid.

The present invention also relates to a device for mounting a body in a conduit containing fluid, consisting of an installation unit provided to be placed at a position where installation of said body is desired, said installation unit being arranged to seal around an area of the surface of said fluid conduit, and the installation unit including a channel which is able to be closed and which is directed to said area of the surface.

When it is necessary to do work in a fluid conduit, for example, for connecting a new device, installation of a valve etc, the system is normally emptied to the necessary degree, which is a procedure requiring much time. After the operation new fluid must be added to the system which, in many cases, is disadvantageous because of the increased risk of corrosion. For example, in order to connect branch conduits without emptying the conduit system it is previously known that a divided T-section may be arranged, which can be connected to a pipe under pressure and, when installation is completed, an explosive charge is activated by means of a blow at a particular position, whereby a hole is formed in the pipe inside the T-section. This device thus does not make it possible to block the existing pipe and is thus suitable only when a branch conduit is connected.

Further there is not available any simple and rapid method to interrupt fluid supply when a leakage occurs in a pipe conduit system.

An object of the present invention is to achieve a widely applicable solution to the problem of enabling intrusive work in an existing installation without having to drain the conduit system of pressurized fluid.

The stated object is achieved by means of a method which is characterized by the steps mounting an installation unit onto the conduit at that place, where mounting of said body is desired, whereby sealing is established against the environment around an area, where a hole in the surface of the conduit will be made, inserting a hole making device into the installation unit through a channel which is kept sealed against the environment, making a hole in the conduit in said area maintaining sealing against the environment, insertion of a body through the sealed channel and the made hole, so that the body is placed in the conduit.

The stated object is also achieved by means of a device, which is characterized by that the blocking device includes means for making a hole in said conduit in said sealed area, that said device includes an expandable body able to be inserted through the made hole and to be placed in said conduit in connection with the sealed area and that said channel includes means for sealing substantially tight against the inserted device for making holes and prevent leakage of fluid to the environment.

Figure 9:
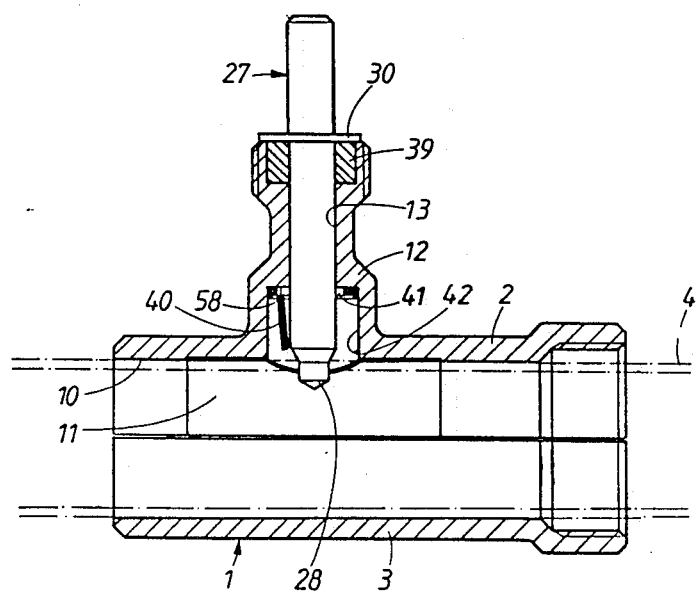
Figure 10:
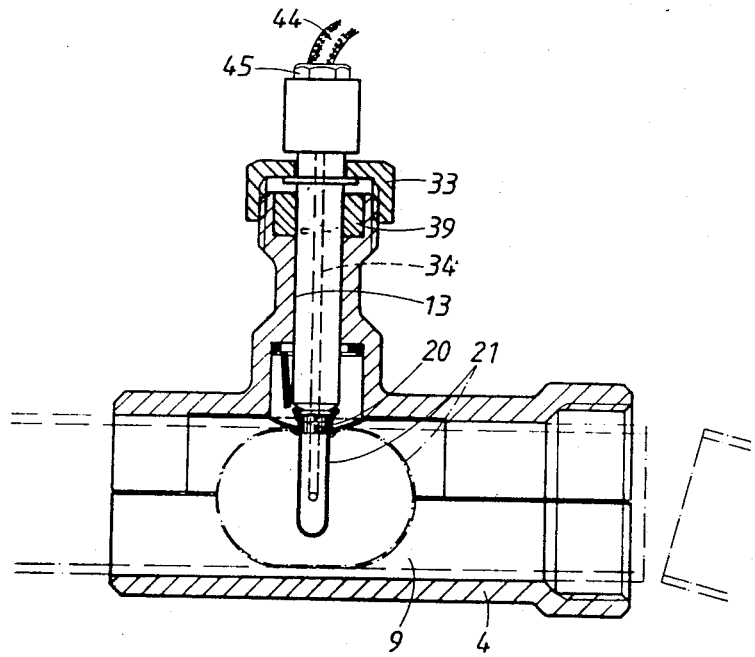
Figure 11:
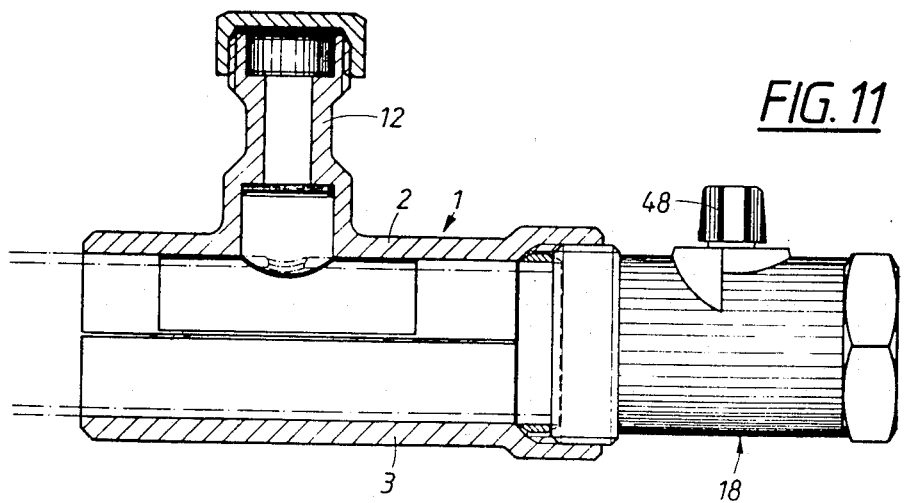
Figure 17:
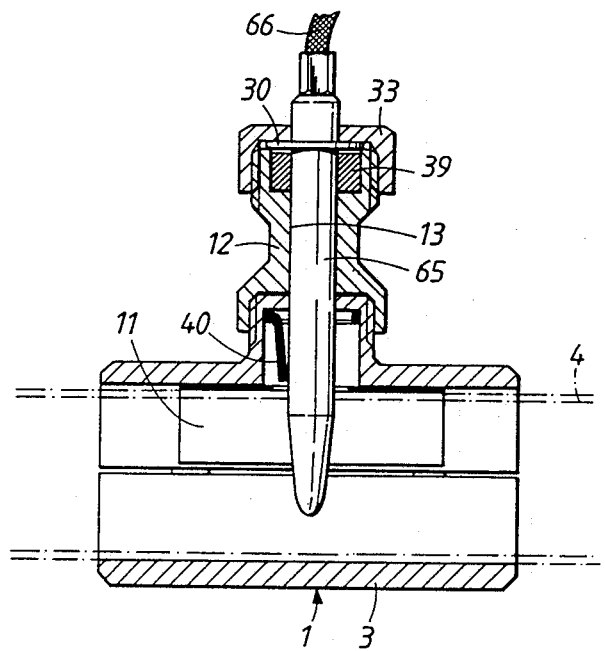

The invention will be described below in more detail using exemplifying embodiments with reference to the accompanying drawings of which FIG. 1 shows an installation unit contained in the blockage device according to the invention, FIG. 2 shows a side view of an alternative embodiment of an installation unit mounted on a pipe, FIG. 3 shows a cross-section of a part of the installation unit shown in FIG. 2, FIGS. 4 to 7 show parts which are included in the blockage device according to the invention, FIG. 8 shows an end view of the installation unit according to the invention corresponding to the embodiment in FIG. 1 and FIG. 9 shows a longitudinal section of the installation unit at a stage in which holes are made in a pipe, FIG. 10 shows a longitudinal section of the embodiment of the blockage device according to the invention during blockage, FIG. 11 shows a longitudinal section of the installation device as in FIG. 10 at a stage during which a valve is being installed. FIGS. 12 through 16 show examples of different applications when intrusive work is done on a pipe installation using the present invention. FIG. 17 shows an example of the installation of a probe in a conduit containing fluid FIGS. 1 to 8 show the parts contained in the blockage device according to the invention and how they are assembled The blockage device consists of an installation unit 1, which is constructed of two installation halves 2, 3 which together are intended to enclose a pipe 4 which contains a fluid under pressure, for example, water or some other liquid gas or the like. The two installation halves 2, 3 form a unit which is mainly cylindrical and they exhibit flanges 4a, 5, 6, 7 for connectors such as screw unions, that is, in the example shown, four screws 8 which are intended to be inserted through holes in the one flange 4a and to be screwed into threaded holes in the other flange 6 The two installation halves are intended to seal against the cylindrical surface 9 of the pipe and they therefore exhibit inwardly concave inner surfaces 10 having the shape of a cylindrical shell, and are intended to delimit a generally cylindrical bore and to seal against the pipe The bore extends through the entire installation unit 1 and has two circular openings through which the pipe 4 can extend through the bore. A gasket 11 is provided in order to achieve satisfactory sealing, and is applied between a portion of the cylindrical inner surface 10 of the one installation half 2 and the pipe 4. Directly in front of the gasket 11 is a connection piece 12, the shape of which is best seen in FIG. 1 This connection piece has a straight channel 13 which is, for example, perpendicular to the pipe 4 the channel, at an opening 14, leading into the cylindrical surface 10 of the one installation half 2. The channel 13 has a circular cross-section and an outer end having an opening 15 which is provided, in normal cases, to be closed by means of a plug, sealing cover 16 or the like, which is intended to be threaded around the outer end of the connection piece 12. One end of the installation unit is preferably formed having an adaptor for direct connection with pipe couplings, valves or the like, such as is shown in FIG. 1. In this example, the installation halves 2, 3 together have a mounting flange 17 with internal threading for connection with a valve 18 having an externally threaded portion 19 at at least its one end.

Other parts associated with the device are shown in FIGS. 4 to 7. FIG. 4 shows a protective sleeve 20 in the shape of a cone made, for example, of plastic or steel, the purpose of which will be described below in more detail FIG. 5 shows a balloon 21 made of a highly elastic material, for example, rubber, the shape of which may thus be changed to a great extent. The balloon 21 extends longitudinally and exhibits a preferably circular cross-sectional shape having in its neutral position shown in FIG. 5 a mainly cylindrical enclosing surface 22 and a mainly cylindrical bore 23. At one end 24, the balloon is closed and, at its opposite end, exhibits an opening 25, around which an edge bulge 26 is provided At its opening 25 the balloon is intended for connection to a source of pressurized air or source of pressurized liquid so as to thus expand and form a body for blocking the pipe 4 in a way which will be described in more detail below FIG. 6 shows a special drill 27 having a drill tip 28 and a cutting edge section 29, the length of which is adapted to the thicknesses of the materials to be drilled The drill 27 has further a stopping flange 30 which stops the drill when the material has been drilled through An upper end 31 of the drill forms a fastening end which is intended for connection to a chuck on a conventional electric drilling machine FIG. 7 shows a valve 32 having a clamping nut 33, by means of which the valve is intended to be screwed securely to the threaded portion on the upper end of the connection piece 12. The valve exhibits an internal through channel 34 which, at the upper end of the valve via an opening 60, is intended for connection to a conduit for pressurized fluid. At its lower end the channel 34 terminates in at least one opening 35 in a portion 36 on to which the balloon 21 is intended to be threaded Furthermore, the valve exhibits a seat 37 in the form of a throat which forms a securing device for the balloon by forming a support for its edge bulge 26. The valve 32 preferably also has a non return valve (not shown) in order to maintain overpressure in the balloon when it is subjected to pressure and a connecting conduit for pressurized fluid has been removed.

Other parts necessary for the use of the invention consist of a membrane 38 or a gasket in the channel 13 (see FIG. 1), which is positioned in the connection piece 12 and which is suitably formed having a U-shaped fractural indentation in order to create a tongue 40 (see FIG. 9) which can be swung downwards upon insertion of the drill and which resiliently can swing back in order to close the opening formed after removal of the drill. At the upper end of the connection piece 12, an axle gasket 39 is further provided in order to provide sealing around the drill 27 during its operation. The axle gasket thus has a central hole, the diameter of which is adapted for sealing contact against the walls of the drill.

Blockage of a conduit for pressurized fluid by means of the blockage device according to the invention is carried out in the following manner. The installation unit 1 is installed around the pipe 4 at the place where blockage of fluid or gas is desired. An installation unit is thereby chosen such that its dimensions are adapted to the outer diameter of the pipe 4 in question. In the initial position, the two installation halves 2, 3 of the installation unit are separated and are applied from two opposing sides of the pipe, facing toward each other, and are securely screwed to one another by means of the screws 8 which are tightened relatively forcefully so that the sealing element 11 is securely clamped and seals a region between the installation unit 2 and the outer surface of the pipe 4. In this initial position, the sealing cap 16 is screwed on and the membrane 38 is unbroken. When the installation unit 1 is fully installed, the sealing cap 16 is removed by unscrewing it so that the opening 15 of the channel 13 is exposed.

The hole making phase is begun when the securing end 31 of the drill is secured in the chuck of a drilling machine and is lowered into the channel 13 and is placed against the membrane 38, whereupon the tongue 40 which is thereby formed swings downwardly and exposes an opening 41 in the membrane (FIG. 9). The size of the outer diameter of the drill generally corresponds to the inner diameter of the channel 13 so that the drill thereby is provided with good guidance into the channel, during which, the drill is in sealing contact against the axle gasket 39. The drill 37 is thereupon caused to rotate while the drill tip 28 is applied to the outer surface of the pipe 4 in order to drill a hole in the pipe. When the drill has penetrated the wall of the pipe, the stopping flange 30 will come into contact with the upper end of the connection piece 12 and will prevent the drill from penetrating unnecessarily far or, will prevent the drill chuck from coming into contact with the axle gasket 39. Thereafter, the drill 27 is removed, whereupon the tongue 40 swings back to the sealing position because of its elasticity, aided by the over pressure in the interior of the conduit. The fractual indentation is angularly chamfered in such a way that the surfaces seal against each other while the tongue 40 is supported by a collar surface 58 at the transition between a widened portion 42 of the bore 13 to a narrower portion which corresponds to the diameter of the drill.

After the step of making the hole by means of the drill 27 there follows a step whereby the balloon 21 with the valve 32 are applied. Firstly, the balloon 21 is threaded on to the forward end of the valve, that is, the portion 36, whereupon the channel 34 of the valve will open at the opening 35 into the interior region 23 of the balloon while the edge bulge 26 sealingly contact the valve seat 37 in an effective manner so that the balloon is held in this position. The end 60 of the valve is connected to a tube 44 for pressurized fluid as is shown in FIG. 10 by means of a bushing 45 which is provided at the end of the tube for pressurized fluid and which is screwed into threads 61 in the end of the valve. The other end of the pressurized fluid tube 44 is connected to a source of pressurized fluid, for example, gas or liquid, such as pressurized air or water. Before the pressurization medium is applied through the tube 44 the valve, with the mounted balloon, is mounted in the channel 13 of the connection piece 12 as is shown in FIG. 10. Before this, however, the protective covering 20 has been positioned on the valve so that, by its conical shape, it will connect with a conical portion 46 on the valve (see FIG. 7). This portion protects the balloon 21 in the hole 47 made in the wall of the pipe 4 by the drill 27. The outer diameter of the valve also corresponds to the outer diameter of the bore 27 and fits in the channel 13 as well as in the axle gasket 39, which seals against the valve. The protective casing 20 also receives some sealing in connection with the material in the balloon. The clamping nut 33 of the valve has internal threading which measure with the external threading on the outer end of the connection piece 12 and it is screwed on to it.

The blockage device is now ready for the blockage step itself by holding the balloon 21 in place in the fluid channel of the pressurized fluid conduit 4. Pressurized fluid, which can be a completely different type of fluid than the fluid that is to be blocked, is applied via the pressurized fluid tube 44 through the channel 34 in the valve 32. When the pressurization medium through the valve is caused to flow out through the opening 35, the balloon 21 is caused to expand because of the increased pressure which is formed in the internal region 26 of the balloon and because of the elastic properties of the material of the balloon.

When a certain volume is caused to flow into the balloon or when a certain pressure is reached in it, which corresponds to a shape and size of the balloon according the broken lines in FIG. 10, that is to say, when the wall of the balloon is expanded so that it seals against the entire inner surface of the pipe 4, application of the pressurization medium to the valve 32 is interrupted. Volume or pressure may be sensed by means of a measurement instrument (not shown). This expansion of the balloon takes place against the effect of the pressure present in the pipe 4 and the fluid flowing in it, which is blocked in the pipe at a drainage position, where the fluid is thus applied from one direction and is intended to flow in the direction indicated by the arrow 48.

When the pressurization medium intended for expansion of the balloon is no longer applied, it is arranged for the balloon to continue to be placed under pressure which, as has been mentioned above, is preferably done by means of a non returning valve built in to the valve. Thereafter, the section of the pipe 4 located, in the direction of flow according to the arrow 48, can be subjected to intrusion without risking that large amounts of fluid flow out. In the example shown in FIG. 10, the pipe is cut off whereafter, for example, a threaded portion 19 of a valve 18 may be screwed on to the threaded flange 17 on the installation unit 1.

When a shut off valve 18 is switched by means of its maneouvering device 48 to a closed position, the excess pressure in the balloon 21 is eliminated by activating the non return valve so that the pressurization medium, for example, is released to the surroundings, whereupon the balloon returns to its neutral position and the valve, with the balloon, can, after unscrewing the tightening nut 33, be removed. The membrane 38 thereby returns to the sealing position before the valve passes the gasket 39, thereby guaranteeing that no leakage of the pressurization medium from the pipe 4 occurs. Thereafter, the sealing cap 16, which is provided with a suitable sealing element so that it sealingly closes the opening 15, is mounted. Thereafter the desired work may be carried out on the conduit beyond the cut off valve 18.

FIGS. 2 and 3 show a variation of the embodiment described heretofor, the variation having a separate pipe piece 49 which is intended to replace the sealing cap 16 which, thereby, before and after the steps of making holes and of blockage, is screwed directly on to external threading 50, whereby, after the blockage step, the sealing caps 16 are mounted. The separate pipe piece corresponds otherwise completely to the connection piece 12 but the arrangement has the advantage that it requires less space for permanent installation, which is also seen in the various installation examples shown in FIGS. 12 to 16.

FIG. 12 shows one installation example in which the pipe is cut off a short distance from the installation unit 1. The pipe is cut off at one additional location whereby a section of the pipe is removed in order to make room for a shut off valve 18 which is joined to the pipe by means of conventional pipe connectors 51, 52 on either side of the valve. FIG. 13 shows a side view of the blockage device according to the invention, mounted on a pipe 4. FIG. 14 shows an installation in a closed system where two installation units 1 are connected on either side of an intermediate section, in which intrusive work is performed. In this case, two shut off valves 18 are mounted directly on the installation unit 1, corresponding to the example according to FIG. 1. By means of pipe connectors 53 a device, for example, a flow meter or a volume meter such as a usage meter, is connected, which consequently may be carried out without having to drain the systems of its content. In this case the two installation units have been mounted at required positions and blockage according to the procedure described above is carried out before cutting off the pipe between the two positions. FIG. 15 shows a corresponding example where a branch pipe 55 is connected in addition to the required pipe connectors 56, 57. FIG. 16 shows an additional example of the connection of a cut off valve 18 for a somewhat different embodiment, via an intermediate pipe connector 59.

FIG. 17 shows a further embodiment, which however is not provided for blocking the fluid conduit 4, but is included in the common principle of the present invention therein that it contains a body 65 to be inserted at least partly into to the conduit. In this example the body 65 consists of a sensor or probe for the measurement of any parameter of the fluid, contained within the conduit 4. Such parameters can be temperature, pressure, flow volume, flow velocity etc. The body has the shape of a rod, which is to be mounted by means of the above described method relative to the mounting of the valve 32, supporting the balloon. Consequently, a bore hole is taken up by means of a drill 27 and thereafter the sensor 65 for measurement or other process control is inserted into the straight channel 13 of the piece 12 without the leakage of any noticable amount of fluid. This is possible because of the included means which are the same means as in the embodiment of for example FIG. 10 Consequently the tongue 40 and the axle sealing 39 and also the clamping nut 33 are included. THe body 65 has outer dimensions adapted to the dimensions of the channel 13 and also has a stopping flange 30. In a conventional way the body 65 is connected to any device for collecting and utilizing the measuring information, over a cable 66 for example.

The invention is limited neither to that which has been described above nor to the exemplifying embodiments shown in the drawings, but may vary within the scope of the following patent claims. It is for example conceivable to use a standard drill instead of the specialized drill shown, whereby suitable dimensions are chosen in order to guarantee satisfactory sealing with the axle gasket. It is also possible for the connection piece 12 to be not perpendicular but, rather, inclined relative to the installation unit 1 and the surrounded pipe 4 in order to create a wedge effect between the balloon and the inner wall of the pipe. The outer and inner surface 22, 23 of the balloon 21 may even be wavy in order to have a greater total surface area and in order to achieve better expansion properties. The protective casing 20 may even be moulded in the balloon 21 at the edge bulge 26, thus facilitating handling. The general expression fluid has been used above, meaning that the invention may be used with conduits for both liquids and gases.

I claim:

1. A method for mounting an expandable blocking body (21) in a conduit (4) containing fluid, comprising the steps of releasably mounting an installation unit (1) having a channel (13) with a first sealing means (39) mounted therein onto the conduit (4) at a place where mounting of said body is desired, establishing during said mounting a sealing by a second sealing means (11) between said conduit and said installation unit against the environment around an area where a hole (47) in the surface of the conduit will be made, inserting a hole making device (27) through said first sealing means and into said channel of said installation unit having a diameter such that it is in sealing contact with said first sealing means (39) in order to keep said channel sealed against the environment when said device is situated in said channel, providing a third sealing means in said unit between said first and second sealing means in the form of a resilient reclosable valve means (40,41), moving said hole making device so that it pushes said reclosable valve means (40) open in a direction towards said conduit and making said hole (47) in said conduit in said area while still maintaining sealing against the environment, thereby establishing communication between said hole and said channel, moving said device out of said hole and said reclosable valve means whereby said reclosable valve means (40) closes before said device passes said first sealing means by means of the resiliency thereof and/or the pressure of the fluid in said conduit so that leakage is avoided, inserting a valve (32) for connection to a pressure medium through said first sealing means and having a body with a diameter substantially equal to the diameter of said hole making device and an expandable body (21) at an end thereof into said channel and pushing said reclosable valve means open again and inserting said expandable body through said hole, so that said expandable body is placed in said conduit at the place where the conduit is to be blocked, while still maintaining sealing against the environment by said first and second sealing means, expanding said expandable body to a cross-sectional area and shape adapted to the inner cross-sectional area of the conduit by operating said valve, whereby the conduit is blocked, after completing any necessary work on the conduit, reducing the dimension of said expandable body to such a shape that it can be taken out through said hole, and removing said valve (32) and expandable body (21) from said hole and through said reclosable valve means (40,41) so that the latter can again close before said valve (32) passes said first sealing means (39), whereby sealing is still maintained against the environment and leakage is still avoided.

2. A method according to claim 1, wherein a further body is introduced into said hole (47), which further body consists of a sensor for measuring one or more parameters of the fluid, while maintaining said sealing against the environment.

3. A method according to claim 1, wherein said expandable body (21) is expandable by a supply of pressure medium to an inner space (23) of said body and that said reduction of dimensions of the body is accomplished by removing said pressure medium.

4. A service kit for mounting an expandable blocking body (21) into a conduit (4) containing fluid, comprising a releasable installation unit (1) adapted to be placed at a location on said conduit where positioning of said body is desired, said installation unit having a channel extending substantially perpendicular to said conduit when said unit is placed thereon and having an outwardly facing opening which has substantially the same dimensions as the channel, first annular sealing means (39) in said channel, second sealing means (11) positioned around an area of the surface of said conduit and between said conduit and said installation unit where said blocking body is desired to be positioned, a third sealing means comprising a resilient reclosable valve means (40,41) in said unit positioned between said first and second sealing means and having a valve member (40) which is openable in a direction towards said conduit when being pushed by a device which is introduced through said channel and moved toward said conduit, said valve member being reclosable when said device is removed, a hole making device (27) for insertion through said channel for making a hole in said conduit within said area, a valve device (32) for insertion through said channel and adapted for connection to a pressure medium, and an expandable blocking body (21) for mounting on an end of said valve device for blocking the fluid in said conduit, said hole making device and said valve device having substantially the same outer diameter which is substantially equal to the inner diameter of said first annular sealing means (39) whereby they sealingly interact with said first sealing means, and said first sealing means (39) and reclosable valve means (40,41) being so positioned relative to each other in said unit whereby when said hole making device and valve device are being removed from said channel said devices are still in sealingly contact with said first sealing means after said valve member (40) closes, whereby sealing is maintained against the environment and leakage is avoided.

5. A kit according to claim 4, wherein said expandable means (21) after expansion thereof, establishes an internal seal against the inner surface of the conduit (4) in connection with the sealed area, whereby the conduit (4) is blocked, said body being arranged to be compressed in order to be removed through said hole after finished work in the conduit.

6. A kit according to claim 5, wherein the expandable body (21) includes a balloon of a material which is elastic to a high degree and has an internal space (23) and an opening (25), by means of which the balloon is able to be connected to a pressure medium source for the expansion of the balloon.

7. A kit according to claim 5, wherein the installation unit (1) comprises two installation halves (2,3) provided to be connected around the conduit (4) and has a through space with two openings, through which the conduit is provided to extend into and through the installation unit in the installed condition of the device, and that one of the installation halves (2) has a laterally directed opening (15) arranged to normally be sealed relative to an area of the internal space of the installation unit, through which opening said area is accessible for making a hole and insertion of the expandable body (21).

8. A kit according to claim 6, wherein the valve device (32) includes a valve means (35, 36, 37) at one of its ends onto which the balloon (21) is arranged to be mounted.

9. A kit according to claim 8, wherein said one end (36) of the valve device (32) has a seat (46), over which the balloon (21) is to be threaded and which is provided to be connected to an edge portion of the hole (47) made in the conduit (4).

* * * * *